United States Patent
Liao

(10) Patent No.: US 10,146,367 B2
(45) Date of Patent: Dec. 4, 2018

(54) SYNCHRONIZATION METHOD AND TOUCH SIGNAL PROCESSING SYSTEM USING THE SAME

(71) Applicants: IMAGINATION BROADWAY LTD., New Taipei (TW); SALT International Corp., New Taipei (TW)

(72) Inventor: Zong-Bin Liao, New Taipei (TW)

(73) Assignees: IMAGINATION BROADWAY LTD., New Taipei (TW); SALT INTERNATIONAL CORP., New Taipei (TW)

( * ) Notice: Subject to any disclaimer, the term of this patent is extended or adjusted under 35 U.S.C. 154(b) by 67 days.

(21) Appl. No.: 15/386,668

(22) Filed: Dec. 21, 2016

(65) Prior Publication Data
US 2017/0185216 A1    Jun. 29, 2017

(30) Foreign Application Priority Data
Dec. 23, 2015   (TW) .............................. 104143353 A

(51) Int. Cl.
| | | |
|---|---|---|
| G06F 3/041 | (2006.01) | |
| G06F 3/044 | (2006.01) | |
| G06F 13/10 | (2006.01) | |
| G06F 15/16 | (2006.01) | |

(52) U.S. Cl.
CPC ............ *G06F 3/0416* (2013.01); *G06F 3/044* (2013.01); *G06F 3/0412* (2013.01); *G06F 13/10* (2013.01); *G06F 15/16* (2013.01)

(58) Field of Classification Search
CPC ...... G06F 3/0416; G06F 15/16; G06F 3/0412; G06F 3/044; G06F 13/10
See application file for complete search history.

(56) References Cited

U.S. PATENT DOCUMENTS

| | | | |
|---|---|---|---|
| 2011/0063094 A1* | 3/2011 | Meiertoberens ..... | A61B 5/0002 340/12.5 |
| 2014/0057569 A1* | 2/2014 | Toivanen ............ | H04M 1/7253 455/41.3 |
| 2015/0309650 A1* | 10/2015 | Ahmed ................ | G06F 3/0416 345/173 |

* cited by examiner

*Primary Examiner* — Aneeta Yodichkas
(74) *Attorney, Agent, or Firm* — WPAT, PC

(57) ABSTRACT

A synchronization method for a touch signal processing system is provided. The touch signal processing system includes a first and a second detecting unit. The method includes the following steps. First, the second detecting unit sends a sync start signal to the first detecting unit and then switches to an idle mode. After receiving the sync start signal, the first detecting unit sends a wake-up signal through a first hardware pin to the second detecting unit. The first detecting unit is then put on hold for a predetermined delay time. After receiving the wake-up signal through a second hardware pin, the second detecting unit switches to a working mode. The first detecting unit which has been put on hold for the predetermined delay time and the second detecting unit that is in the working mode respectively drive one or more analog-to-digital converters, so as to detect touch signals.

15 Claims, 4 Drawing Sheets

SYNCHRONIZATION METHOD AND TOUCH SIGNAL PROCESSING SYSTEM USING THE SAME

RELATED APPLICATIONS

This application claims priority to Taiwan patent application, No. 104143353, filed on Dec. 23, 2015, entitled "Synchronization Method and Touch Signal Processing System Using the Same", which is hereby incorporated by reference in its entirely.

BACKGROUND OF THE INVENTION

Technical Field

The present invention relates to a synchronization method and a signal processing system using the method. More particularly, the present invention relates to a touch signal synchronization method and a touch signal processing system using the method.

Description of Related Art

Along with the development of technology, the needs for more efficiently processing data or signals are more demanded. Under such development trend, the processing power of one single integrated circuit has no longer sufficient. Therefore, it is natural that multiple-IC solutions are getting more and more attention. By utilizing multiple-IC, for example using multiple microprocessors, multiple digital signal processors in a signal processing system, the processing power and multi-task ability of the system can be greatly increased. However, under the high-speed, high-frequency operating conditions, the signal synchronization rate between different integrated circuits are getting more and more important.

In one example, in a signal processing system that is used for processing touch signals, when a single IC is used to drive multiple analog-to-digital converters (ADCs) to conduct touch signal detection, these ADCs are receiving signals from the same processing core (i.e. the single IC), there will normally be no synchronization defects among these ADCs. Due to the reason that the electronic devices are now having higher and higher standards for processing touch signals, like growing touch point numbers, rising refreshing rates, or increasing touch accuracy, multiple ICs are used in an attempt to collaborate with multiple high speed, high frequency ADCs. When different ADCs are receiving signals from different ICs correspondingly, the inconsistency between any two ADCs in signal synchronization will lead to failure of hopping frequency measurement. The hopping frequency measurement is used to avoid noises from affecting touch signals. In the case of failure hopping frequency measurement, the touch accuracy will be affected accordingly.

Generally, during synchronization between different ICs, a slave IC is selected to do polling with program codes to frequently read signals from the master IC. The synchronization will not start until the signal from the master IC is picked up by the slave IC. The synchronization rate related to software program codes will be affected by the length of the codes, thus the system has the chance of incurring a temporal error whose duration is equal to one or more NOPs (no-operation-perform, NOP). The temporal error normally includes 1-4 NOPs (depending on the length of the codes) and can be regarded as an unexpected time differentiation between the slave IC and the master IC. Consequently, the effect of the hopping frequency measurement is diminished, and the efficiency of filtering out the noise is decreased. Further, the touch control accuracy of the system is affected accordingly.

SUMMARY

The synchronization method and the touch signal processing system using the method utilize the hardware pin of one detecting unit to wake up another detecting unit. The two detecting units, therefore, can start off the touch signal detection at the same time. While commencing signal synchronization, the problem of unexpected time differentiation can be avoided.

According to one aspect of the invention, a synchronization method for a touch signal processing system including a first detecting unit and a second detecting unit is provided. The method includes the following steps: a step of sending a sync start signal by the second detecting unit to the first detecting unit; a step of switching the second detecting unit to an idle mode; a step of sending a wake-up signal by the first detecting unit to the second detecting unit in the idle mode via a first hardware pin after the first detecting unit receives the sync start signal; a step of putting the first detecting unit on hold for a predetermined delay time after sending the wake-up signal; a step of switching the second detecting unit to a working mode after the second detecting unit receives the wake-up signal via a second hardware pin; and a step of driving one or more analog-to-digital converters respectively by the first detecting unit which has been put on hold for the predetermined delay time and the second detecting unit in the working mode, thereby conducting a touch signal detection.

In one embodiment of the synchronization method, in the step of switching to the working mode, the second detecting unit requires a wake-up time to switch from the idle mode to the working mode. The predetermined delay time is substantially equal to the wake-up time.

In one embodiment of the synchronization method, the step of driving one or more analog-to-digital converters includes: a step of driving said one or more analog-to-digital converters by the first detecting unit and the second detecting unit respectively with a same frequency hopping measurement mode.

In one embodiment of the synchronization method, before the step of sending the sync start signal, the method further includes a step of sending a synchronization request by the first detecting unit to the second detecting unit.

In one embodiment of the synchronization method, in the step of sending the sync start signal, the sync start signal is sent from the second hardware pin of the second detecting unit to the first hardware pin of the first detecting unit.

In one embodiment of the synchronization method, in the step of sending the sync start signal, the sync start signal is sent from a fourth hardware pin of the second detecting unit to a third hardware pin of the first detecting unit.

In one embodiment of the synchronization method, in the step of sending the start sync signal, the second hardware pin is an external interrupt pin.

According to another aspect of the invention, a touch signal processing system is provided. The system includes a first detecting unit and a second detecting unit. The first detecting unit has a first hardware pin and is configured to send a wake-up signal via the first hardware pin after receiving a sync start signal and to be put on hold for a predetermined delay time after sending the wake-up signal. The second detecting unit has a second hardware pin and is configured to send the sync start signal and to switch to an idle mode after sending the sync start signal. The second detecting unit is further configured to switch to a working mode after receiving the wake-up signal via the second hardware pin. The first detecting unit which has been put on hold for the predetermined delay time and the second detecting unit which is in the working mode are used to drive one or more analog-to-digital converters respectively, thereby conducting a touch signal detection.

In one embodiment of the touch signal processing system, the second detecting unit requires a wake-up time to switch from the idle mode to the working mode. The predetermined delay time is substantially equal to the wake-up time.

In one embodiment of the touch signal processing system, the first detecting unit and the second detecting unit are used to drive said one or more analog-to-digital converters respectively with a same frequency hopping measurement mode.

In one embodiment of the touch signal processing system, the first detecting unit is further configured to send a synchronization request to the second detecting unit.

In one embodiment of the touch signal processing system, the second detecting unit is configured to send the sync start signal via the second hardware pin to the first hardware pin of the first detecting unit.

In one embodiment of the touch signal processing system, the first detecting unit further has a third hardware pin and the second detecting unit further has a fourth hardware pin. The second detecting unit is configured to send the sync start signal via the fourth hardware pin to the third hardware pin of the first detecting unit.

In one embodiment of the touch signal processing system, the second hardware pin is an external interrupt pin.

In one embodiment of the touch signal processing system, the first detecting unit is a driving integrated circuit and the second detecting unit is a sensing integrated circuit.

According to another aspect of the invention, a signal processing system is provided. The signal processing system includes a first integrated circuit and a second integrated circuit. The first integrated circuit has a first hardware pin and is configured to send a wake-up signal via the first hardware pin after receiving a sync start signal and to be put on hold for a predetermined delay time after sending the wake-up signal. The second integrated circuit has a second hardware pin and is configured to send the sync start signal and to switch to an idle mode after sending the sync start signal. The second integrated circuit is further configured to switch to a working mode after receiving the wake-up signal via the second hardware pin. The first integrated circuit which has been put on hold for the predetermined delay time and the second integrated circuit which is in the working mode are used to respectively conduct a signal processing sequence.

The above-mentioned synchronization method and touch signal processing system using the method facilitate the synchronization by way of waking the detecting unit or the integrated circuit via a hardware pin. The unexpected time differentiation can be alleviated, and the synchronization of signals can be more accurate.

BRIEF DESCRIPTION OF DRAWINGS

The invention can be more fully understood by reading the following detailed description of the embodiment, with reference made to the accompanying drawings as follows.

DETAILED DESCRIPTION

Reference will now be made in detail to elaborate the contents and the features of the embodiments of the present invention, examples of which are illustrated in the accompanying drawings.

In the synchronization method and the touch signal processing system using the same according to the embodiments of the invention, a wake-up signal is sent by a first detecting unit via a hardware pin. After the first detecting unit has been put on hold for a predetermined delay time, it starts to drive one or more corresponding analog-to-digital converters, so as to conduct touch signal detection. A second detecting unit switches to a working mode from an idle mode after receiving the wake-up signal and starts to drive one or more corresponding analog-to-digital converters, so as to conduct touch signal detection. As a result, the first and the second detecting unit can start off the touch signal detection at the same time.

Figure 1:
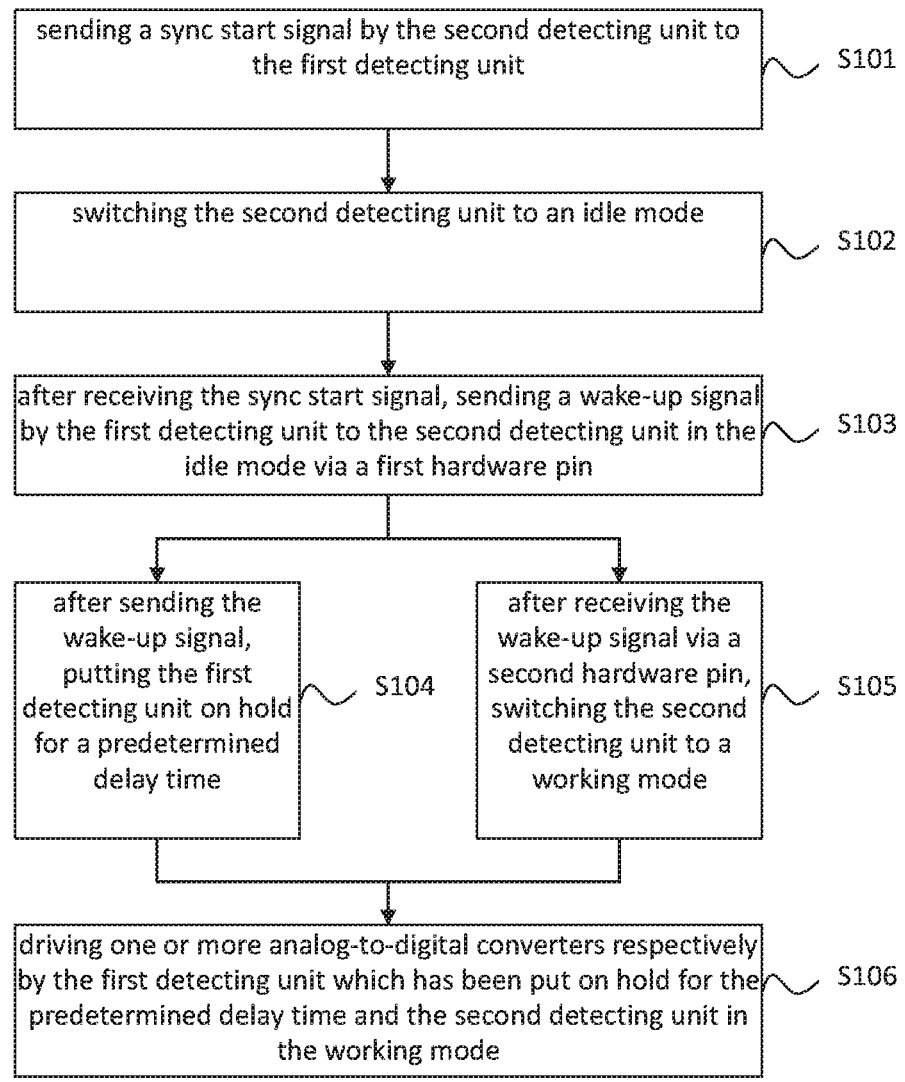
FIG. 1 is a flowchart of a synchronization method according to one embodiment of the invention.

Please refer to FIG. 1, which is a flowchart of a synchronization method according to one embodiment of the invention. The synchronization method of the present embodiment is to be utilized in a touch signal processing system. The touch signal processing system includes a first detecting unit and a second detecting unit. The details of the touch signal processing signal system will be elaborated in the below with accompanying drawings, and will not be discussed for now.

Firstly, the synchronization method of the present embodiment performs step S101. A sync start signal is sent by the second detecting unit to the first detecting unit. In the present embodiment, the second detecting unit sends the sync start signal while it is operating in a working mode.

Step S102 is performed after step S101. In step S102, the second detecting unit is switched to an idle mode. In the present embodiment, the second detecting unit is switched from the working mode to the idle mode. In the idle mode, the second detecting unit is in an inactive state, e.g. hibernation state, energy saving state, or other states that will not be regarded as a normal operating state by a person who is skilled in the related art. At this moment, the second detecting unit is unable to perform massive calculations and process massive tasks, yet it is still able to detect whether the second detecting unit is being woken up or not by staying in a relatively low power consumption state.

The method of the present embodiment then enters step S103. After the sync start signal from the second detecting unit is received by the first detecting unit, a wake-up signal is sent by the first detecting unit via a first hardware pin to the second detecting unit which is in the idle mode. After step S103, the method moves on to both step S104 and step S105.

In step S104, after the first detecting unit sends out the wake-up signal, it is put on hold for a predetermined delay time. The first detecting unit can be put on hold by itself or by other components, depending on the actual requirement of performing the method.

On the other hand, in step S105, after the second detecting unit receives the wake-up signal via a second hardware pin, it switches to the working mode from the idle mode.

In the present embodiment, the first detecting unit sends the wake-up signal, which can be exemplified in the form of a voltage signal, via the first hardware pin to wake up the second detecting unit. Practically, the wake-up signal can also be in any other usable signal forms, as long as it can be sent to the second detecting unit via the first hardware pin to wake the second detecting unit from the idle mode to the working mode. Therefore, the wake-up signal is not limited to the voltage signal in the present invention.

Furthermore, the second detecting unit requires a wake-up time to switch (or to transform) from the idle mode to the working mode. The wake-up time is invariable; that is, every time when the second detecting unit switches from the idle mode to the working mode, the wake-up time is the same. The wake-up time of a specific integrated circuit unit is already known since the design stage, so the wake-up time of the second detecting unit can be acquired in advance.

Since the wake-up time of the second detecting unit can be acquired in advance, the wake-up time can be used to set the predetermined delay time. In one example, the wake-up time can be acquired by measuring the second detecting unit as a no-operation-performed time. By setting the predetermined delay time in accordance with the wake-up time, the problem of unexpected time differentiation during synchronizing signals can be alleviated. In the present embodiment, the predetermined delay time of the first detecting unit is set to be the same as the wake-up time of the second detecting unit. Therefore, step S104 and step S105 can be performed concurrently. The predetermined delay time that the first detecting unit will be put on hold for after sending the wake-up signal is approximately the same as the wake-up time of the second detecting unit switching from the idle mode to the working mode.

Afterward, the synchronization method of the present embodiment moves on to step S106. The first detecting unit and the second detecting unit respectively drive one or more analog-to-digital converters to conduct touch signal detection. In one embodiment, the first detecting unit drives its corresponding one or more analog-to-digital converters with a hopping frequency mode, and the second detecting unit drives its corresponding one or more analog-to-digital converters with the same hopping frequency mode. In the condition of the predetermined delay time being the same as the wake-up time, the first and second detecting units start off the touch signal detection with the same hopping frequency mode, thereby enhancing the efficiency of avoiding noises for the hopping frequency mode. In another embodiment, the first detecting unit and the second detecting unit can be used to respectively drive at least one same analog-to-digital converter with the same hopping frequency mode.

In one embodiment of the synchronization method, the first hardware pin of the first detecting unit is connected to the second hardware pin of the second detecting unit. The two detecting units are connected by a pair of hardware pins. The second hardware pin can be exemplified by an external interrupt pin. The first detecting unit sends the wake-up signal via the first hardware pin to the second detecting unit which is in the idle mode. The second detecting unit sends the sync start signal via the second hardware pin to the first detecting unit. However, the present invention is not limited thereto. In fact, the sync start signal and the wake-up signal can be transferred via different pairs of hardware pins. In another embodiment of the invention, the first detecting unit has the first hardware pin and a third hardware pin, and the second detecting unit has the second hardware pin and a fourth hardware pin. The first hardware pin is connected to the second hardware pin, and the wake-up signal is sent by the first detecting unit to the second detecting unit through the first pair of pins. The third hardware pin is connected to the fourth hardware pin, and the sync start signal is sent by the second detecting unit to the first detecting unit through the second pair of pins.

In another embodiment, before step S101, the synchronization method may further include a step of sending a synchronization request by the first detecting unit to the first detecting unit. Therefore, the subject of initializing the synchronization is the first detecting unit. The second detecting unit passively starts corresponding steps in response to the synchronization request.

According to the above-mentioned embodiments of the synchronization method, the first detecting unit that has been put on hold for the predetermined delay time and the second detecting unit switched to the working mode start driving their corresponding analog-to-digital converters respectively, so as to conduct touch signal detection. The predetermined delay time is set in accordance with the known wake-up time, so the problems like unexpected time differentiation during synchronization can be alleviated.

Figure 2:
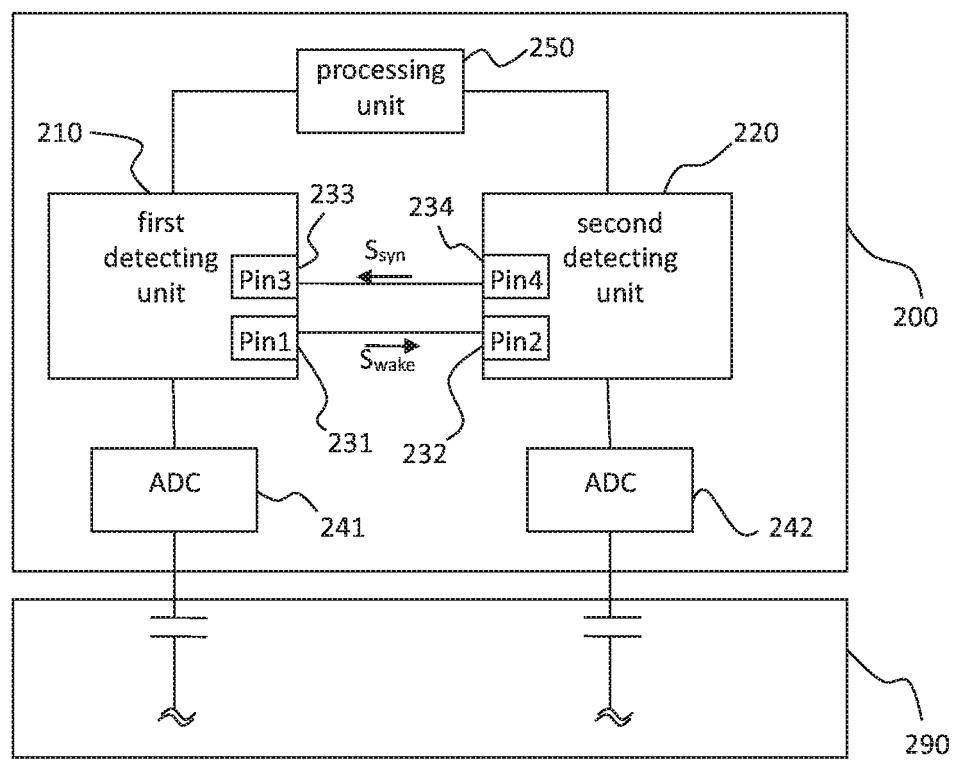
FIG. 2 is a schematic diagram showing one touch signal processing system according to one embodiment of the invention.

The detailed description now directs to a touch signal processing system. Please refer to FIG. 2, which is a schematic diagram showing one touch signal processing system according to one embodiment of the invention. The touch signal processing system 200 is connected to a touch panel 290. The touch panel 290 is exemplified by a capacitance touch panel where the touch signals are generated with the change in capacitance as the finger of the user touches the panel. The touch signal processing system 200 performs post signal calculating or post signal processing based on the touch signal, such as touch point reporting, touch point tracking, and noise filtering.

The touch signal processing system 200 includes a first detecting unit 210 and a second detecting unit 220. The first detecting unit 210 includes a first hardware pin 231 and a third hardware pin 233. The second detecting unit 220 includes a second hardware pin 232 and a fourth hardware pin 234. In the present embodiment, the first hardware pin 231 is connected to the second hardware pin 232, and the third hardware pin 233 is connected to the fourth hardware pin 234. The second hardware pin 232 is exemplified by an external interrupt pin of the second detecting unit 220 in the present embodiment.

The first detecting unit 210 is configured to send a wake-up signal $S_{wake}$ via the first hardware pin 231 after receiving a sync start signal $S_{syn}$. The first detecting unit 210 is then put on hold for a predetermined delay time after sending the wake-up signal $S_{wake}$. The first detecting unit 210 can be put on hold by itself or by other components of the system 200. The second detecting unit 220 is configured to send the sync start signal $S_{syn}$ via the fourth hardware pin 234 to the third hardware pin 233 of the first detecting unit 210. The second detecting unit 220 then switches to an idle mode after sending the sync start signal $S_{syn}$. The second detecting unit 220 is further configured to switch to a working mode after receiving the wake-up signal $S_{wake}$ via the second hardware pin 232. The first detecting unit 210 which has been put on hold for the predetermined delay time and the second detecting unit 220 which is in the working mode drive different analog-to-digital converters 241 and 242 respectively, so that the values related to the capacitance change in the touch panel 290 can be acquired, and the touch signal can be detected accordingly. In another embodiment, the first and the second detecting unit 210 and 220 can respectively drive two or more analog-to-digital converters. In yet another embodiment, the two detecting units 210 and 220 can drive at least one same analog-to-digital converter.

The second detecting unit 220 requires a wake-up time switching from the idle mode to the working mode. Since the wake-up time is already known from the design stage or the wake-up time can be acquired by measuring the second detecting unit 220 in advance, the wake-up time here is a known one. In addition, since every time when the second detecting unit 220 switches from the idle mode to the working mode, the wake-up time is the same, the wake-up time here is an invariable one. Under the condition of knowing the wake-up time already, the predetermined delay time of the first detecting unit 210 can therefore be determined in accordance with the wake-up time. In the present embodiment, the predetermined delay time is set to be approximately the same as the wake-up time. In other words, the predetermined delay time that the first detecting unit 210 will be put on hold for after sending the wake-up signal $S_{wake}$ is approximately the same as the wake-up time of the second detecting unit 220 switching from the idle mode to the working mode. Therefore, the first detecting unit 210 and the second detecting unit 220 can start off the touch signal detection at the same time.

In order to match the needs of different measurement modes, in another embodiment, the predetermined delay time can either be shorter or longer than the wake-up time, such that the time point of starting the touch signal detection for the first detecting unit 210 would be either earlier or later than the time point of starting the touch signal detection for the second detecting unit 220. By way of knowing the wake-up time in advance and determining the predetermined delay time accordingly, the time differentiation between the two detecting units 210, 220 respectively starting to conduct the touch signal detection can be fully controllable. The problems of unexpected time differentiation can be eliminated accordingly.

Under the condition of predetermined delay time approximately being equal to the wake-up time, the first detecting unit 210 and the second detecting unit 220 can respectively start to drive corresponding analog-to-digital converters 241, 242 at the same time. The two detecting units 210, 220 use the same hopping frequency measurement modes to respectively drive analog-to-digital converters 241, 242. Thus, by utilizing the hopping frequency measurement modes to reduce the effect of noises on the touch signal, the accuracy of touch control can be increased therefrom.

In the present embodiment, when the touch signal processing system 200 starts to commence signal synchronization, the first detecting unit 210 can firstly send a synchronization request to the second detecting unit 220 and then wait for the response from the second detecting unit 220. Here in the embodiment, the synchronization request is passed through the connected third and fourth hardware pins 233, 234. Disregard the measurement mode or the task that the second detecting unit 220 is currently running, the second detecting unit 220 will start to prepare for signal synchronization after receiving the synchronization request. As ready, the second detecting unit 200 sends the sync start signal $S_{syn}$ to the first detecting unit 210 and follows the steps of the synchronization method afterward.

The touch signal processing system 200 of the present embodiment of the invention further includes a processing unit 250. The processing unit 250 is configured to receive the touch signals detected by the first and second detecting units 210, 220, and to perform following calculations or processes. The first detecting unit 210 can be exemplified by a drive integrated circuit, which is used to enable one or more drive electrodes of the touch panel 290. The second detecting unit 220 can be exemplified by a sense integrated circuit, which is used to enable one or more sense electrodes of the touch panel 290. The second hardware pin 232 can be an external interrupt pin. In one embodiment, the first, second, third, and fourth hardware pins 231, 232, 233, 234 are all general purpose input/output (GPIO) pins. The first and second detecting units 210, 220 exchange signals via hardware pins to perform the steps of the synchronization method.

In the previously-described embodiments of the touch signal processing system 200, the start sync signal $S_{syn}$ and the wake-up signal $S_{wake}$ are transferred via different channels (different pairs of connected hardware pins). For example, the start sync signal $S_{syn}$ is transferred through the channel of connected third and fourth hardware pins 233, 234, and the wake-up signal $S_{wake}$ is transferred through the channel of connected first and second hardware pins 231, 232. However, the invention is not intended to be limited thereto. The wake-up signal $S_{wake}$ and the sync start signal $S_{syn}$ can also be transferred through the same channel.

Figure 3:
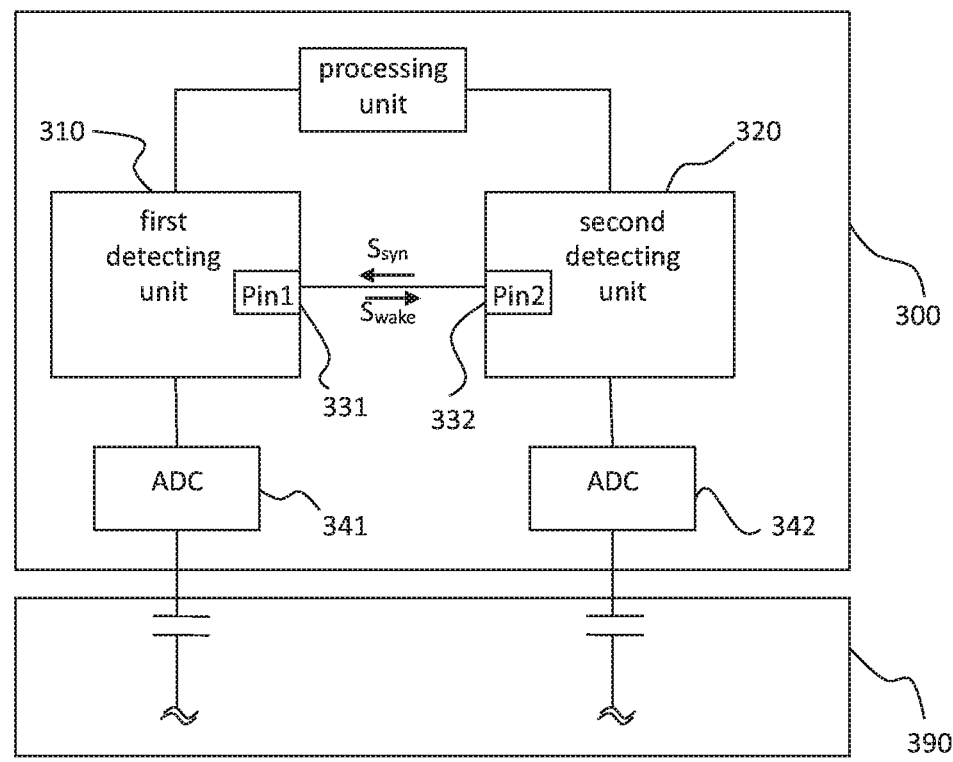
FIG. 3 is a schematic diagram showing one touch signal processing system according to another embodiment of the invention.

Please refer to FIG. 3, which is a schematic diagram of one touch signal processing system according to another embodiment of the invention. The touch signal processing system 300 is connected to a touch panel 390. The touch panel 390 is exemplified by a capacitance touch panel where the touch signals are generated. The touch signal processing system 300 performs post signal calculating or post signal processing based on the touch signal, such as touch point reporting, touch point tracking, and noise filtering.

The touch signal processing system 300 includes a first detecting unit 310 and a second detecting unit 320. The first detecting unit 310 includes a first hardware pin 331, and the second detecting unit 320 includes a second hardware pin 332. The first and the second hardware pins 331, 332 are connected with each other. The second hardware pin 332 can be an external interrupt pin of the second detecting unit 320.

The first detecting unit 310 is configured to send a wake-up signal $S_{wake}$ via the first hardware pin 331 after receiving a sync start signal $S_{syn}$. The first detecting unit 310 is then put on hold for a predetermined delay time after sending the wake-up signal $S_{wake}$. The first detecting unit 310 can be put on hold by itself or by other components of the system 300. The second detecting unit 320 is configured to send the sync start signal $S_{syn}$ via the second hardware pin 332 to the first hardware pin 331 of the first detecting unit 310. The second detecting unit 320 then switches to an idle mode after sending the sync start signal $S_{syn}$. The second detecting unit 320 is further configured to switch to a working mode after receiving the wake-up signal $S_{wake}$ via the second hardware pin 332. The first detecting unit 310 which has been put on hold for the predetermined delay time and the second detecting unit 320 which is in the working mode drive different analog-to-digital converters 341 and 342 respectively, so that the values related to the capacitance change in the touch panel 290 can be acquired, and the touch signal can be detected accordingly. In another embodiment, the two detecting units 310 and 320 can respectively drive two or more analog-to-digital converters. In yet another embodiment, the two detecting units 310 and 320 can drive at least one same analog-to-digital converter.

Figure 4:
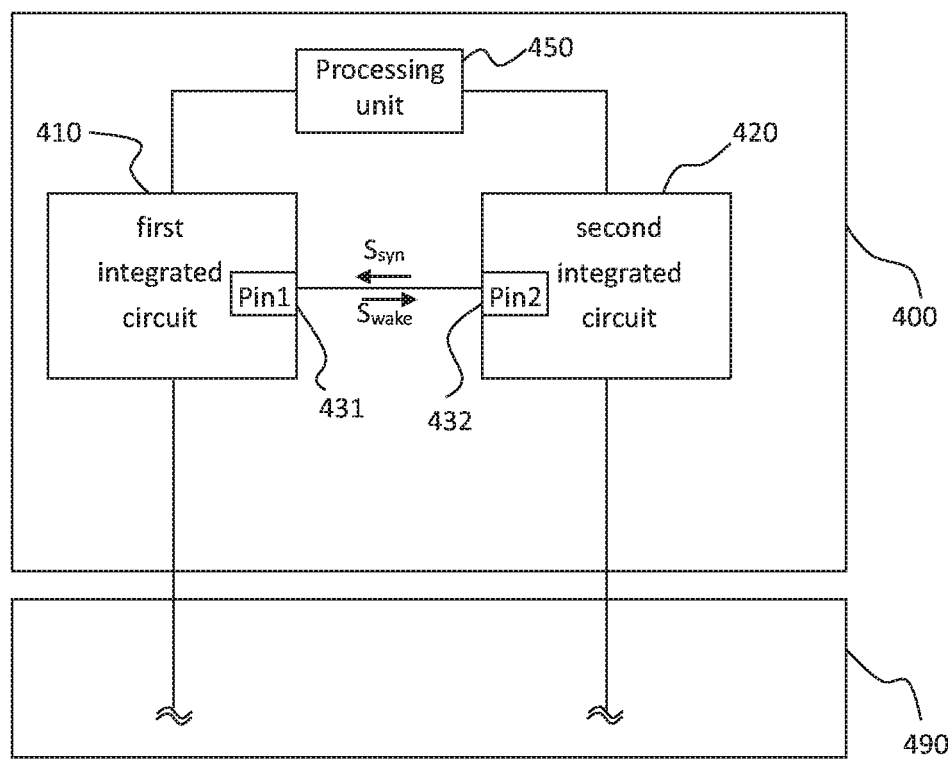
FIG. 4 is a schematic diagram showing one signal processing system according to yet another embodiment of the invention.

Please refer to FIG. 4, which is a schematic diagram of one signal processing system according to yet another embodiment of the invention. The signal processing system 400 is connected to an external signal source 490. The external signal source 490 can be exemplified by a capacitance touch panel or other devices that can generate signals and send signals to the signal processing system 400. The signal processing system 400 performs post signal calculating or post signal processing based on signals sent from the external signal source 490.

The signal processing system 400 includes a first integrated circuit 410 and a second integrated circuit 420. The first integrated circuit 410 includes a first hardware pin 431, and the second integrated circuit 420 includes a second hardware pin 432. The first and the second hardware pins 431, 432 are connected with each other. The second hardware pin 432 can be an external interrupt pin of the second integrated circuit 420. The second integrated circuit 420 can be exemplified by having a micro-processing unit (MPU). The second integrated circuit 420 itself can enter its idle mode, and it can also send requests to ask counter integrated circuit to enter their idle mode. The signal processing system 400 further includes a processing unit 450 configured to perform post signal calculating or post signal processing based on the signals acquired by the first and second integrated circuit 410, 420.

The first integrated circuit 410 is configured to send a wake-up signal $S_{wake}$ via the first hardware pin 431 after receiving a sync start signal $S_{syn}$. The first integrated circuit 410 is then put on hold for a predetermined delay time after sending the wake-up signal $S_{wake}$. The first integrated circuit 410 can be put on hold by itself or by other components of the system 400. The second integrated circuit 420 is configured to send the sync start signal $S_{syn}$ via the second hardware pin 432 to the first hardware pin 431 of the first integrated circuit. The second integrated circuit 420 then switches to an idle mode after sending the sync start signal $S_{syn}$. The second integrated circuit 420 is further configured to switch to a working mode after receiving the wake-up signal $S_{wake}$ via the second hardware pin 432. The first integrated circuit 410 which has been put on hold for the predetermined delay time and the second integrated circuit 420 which is in the working mode perform a signal processing procedure respectively. For example, the two integrated circuits 410, 420 drive different analog-to-digital converters respectively to acquire signals from the external signal source 490, so as to process the signals and/or to send the signals to the processing unit 450 to perform post signal calculating or post signal processing. In another embodiment, the two integrated circuits 410 and 420 can respectively drive two or more analog-to-digital converters. In yet another embodiment, the two integrated circuits 410 and 420 can drive at least one same analog-to-digital converter.

According to the above-described embodiments of the synchronization method and touch signal processing system using the same, the second detecting unit switches to the idle mode after sending the sync start signal to the first detecting unit. After receiving the sync start signal, the first detecting unit sends the wake-up signal and is then put on hold for the predetermined delay time. After receiving the wake-up signal, the second detecting unit switches to the working mode. The first detecting unit that has been put on hold for the predetermined delay time starts to drive one or more corresponding analog-to-digital converters to conduct touch signal detection. The second detecting unit switched to the working mode also starts to drive one or more corresponding analog-to-digital converters to conduct touch signal detection. Since the wake-up time is known and the predetermined delay time is set based on the wake-up time, the time differentiation between the two detecting units can be controllable. The problems of unexpected time differentiation during signal synchronization can be alleviated.

The ordinal numbers used in the detailed description and claims, such as "first", "second", "third", and "fourth", do not necessarily indicate their priority orders; on the contrary, they are merely intended to distinguish different elements. Although the method steps in the detailed description are marked with orderly reference numbers, they are not intended to limit the priorities of the steps. Unless otherwise explicitly provided in the claim language, the order of the method steps may be performed in any possible manner. It will be apparent to those skilled in the art that various modifications and variations can be made to the structure of the present invention without departing from the scope or spirit of the invention. In view of the foregoing, it is intended that the present invention covers modifications and variations of this invention, provided they fall within the scope of the following claims.

What is claimed is:

1. A synchronization method for a touch signal processing system comprising a first detecting unit and a second detecting unit, the synchronization method comprising:
   sending a sync start signal by the second detecting unit to the first detecting unit;
   switching the second detecting unit to an idle mode;
   sending a wake-up signal by the first detecting unit to the second detecting unit in the idle mode via a first hardware pin after the first detecting unit receives the sync start signal;
   putting the first detecting unit on hold for a predetermined delay time after sending the wake-up signal;
   switching the second detecting unit to a working mode after the second detecting unit receives the wake-up signal via a second hardware pin; and
   driving one or more analog-to-digital converters respectively by the first detecting unit which has been put on hold for the predetermined delay time and the second detecting unit in the working mode, thereby conducting a touch signal detection.

2. The synchronization method of claim 1, wherein in the step of switching to the working mode, the second detecting unit requires a wake-up time to switch from the idle mode to the working mode, and the predetermined delay time is substantially equal to the wake-up time.

3. The synchronization method of claim 1, wherein the step of driving said one or more analog-to-digital converters comprises:
   driving said one or more analog-to-digital converters by the first detecting unit and the second detecting unit respectively with a same frequency hopping measurement mode.

4. The synchronization method of claim 1, wherein before the step of sending the sync start signal, the method further comprises:
   sending a synchronization request by the first detecting unit to the second detecting unit.

5. The synchronization method of claim 1, wherein in the step of sending the sync start signal, the sync start signal is sent from the second hardware pin of the second detecting unit to the first hardware pin of the first detecting unit.

6. The synchronization method of claim 1, wherein in the step of sending the sync start signal, the sync start signal is sent from a fourth hardware pin of the second detecting unit to a third hardware pin of the first detecting unit.

7. The synchronization method of claim 1, wherein in the step of sending the start sync signal, the second hardware pin is an external interrupt pin.

8. A touch signal processing system, comprising:
a first detecting unit having a first hardware pin and being configured to send a wake-up signal via the first hardware pin after receiving a sync start signal and to be put on hold for a predetermined delay time after sending the wake-up signal; and
a second detecting unit having a second hardware pin and being configured to send the sync start signal and to switch to an idle mode after sending the sync start signal, and the second detecting unit being further configured to switch to a working mode after receiving the wake-up signal via the second hardware pin;
wherein, the first detecting unit which has been put on hold for the predetermined delay time and the second detecting unit which is in the working mode are used to drive one or more analog-to-digital converters respectively, thereby conducting a touch signal detection.

9. The touch signal processing system of claim 8, wherein the second detecting unit requires a wake-up time to switch from the idle mode to the working mode, and the predetermined delay time is substantially equal to the wake-up time.

10. The touch signal processing system of claim 8, wherein the first detecting unit and the second detecting unit are used to drive said one or more analog-to-digital converters respectively with a same frequency hopping measurement mode.

11. The touch signal processing system of claim 8, wherein the first detecting unit is further configured to send a synchronization request to the second detecting unit.

12. The touch signal processing system of claim 8, wherein the second detecting unit is configured to send the sync start signal via the second hardware pin to the first hardware pin of the first detecting unit.

13. The touch signal processing signal of claim 8, wherein the first detecting unit further has a third hardware pin and the second detecting unit further has a fourth hardware pin, and the second detecting unit is configured to send the sync start signal via the fourth hardware pin to the third hardware pin of the first detecting unit.

14. The touch signal processing signal of claim 8, wherein the second hardware pin is an external interrupt pin.

15. The touch signal processing signal of claim 8, wherein the first detecting unit is a driving integrated circuit and the second detecting unit is a sensing integrated circuit.

* * * * *